(12) United States Patent
Kim et al.

(10) Patent No.: US 8,642,206 B2
(45) Date of Patent: Feb. 4, 2014

(54) BATTERY MODULE

(75) Inventors: Myung-Chul Kim, Yongin-si (KR); Hee-Joon Jin, Yongin-si (KR)

(73) Assignees: Samsung SDI Co., Ltd., Yongin-Si, Gyeonggi-Do (KR); Robert Bosch GmbH, Stuttgart (DE)

( * ) Notice: Subject to any disclaimer, the term of this patent is extended or adjusted under 35 U.S.C. 154(b) by 285 days.

(21) Appl. No.: 13/064,358

(22) Filed: Mar. 21, 2011

(65) Prior Publication Data

US 2012/0115013 A1    May 10, 2012

(30) Foreign Application Priority Data

Nov. 4, 2010 (KR) ......................... 10-2010-0109182

(51) Int. Cl.
*H01M 6/42* (2006.01)

(52) U.S. Cl.
USPC ........... 429/159; 429/138; 429/151; 429/152; 429/163; 429/186

(58) Field of Classification Search
USPC ......... 429/121–123, 138, 143, 148–154, 161, 429/163, 167–168, 176, 178, 181, 186, 158
See application file for complete search history.

(56) References Cited

U.S. PATENT DOCUMENTS

| 2007/0202364 | A1* | 8/2007 | Uh et al. ............................ 429/7 |
| 2010/0021802 | A1* | 1/2010 | Yang et al. ...................... 429/91 |
| 2010/0073005 | A1  | 3/2010 | Yano et al. |
| 2011/0097614 | A1* | 4/2011 | Kim ................................. 429/53 |

FOREIGN PATENT DOCUMENTS

| KR | 10 2007-0043434 A | 4/2007 |
| KR | 10 2010-0034695 A | 4/2010 |
| KR | 10 2010-0041442 A | 4/2010 |

* cited by examiner

*Primary Examiner* — Patrick Ryan
*Assistant Examiner* — Ben Lewis
(74) *Attorney, Agent, or Firm* — Lee & Morse, P.C.

(57) ABSTRACT

A battery module includes a battery array and an end plate. The battery array includes at least two battery cells that are stacked, the battery cells including a terminal surface where an electrode and a vent are exposed and an opposite bottom side. The end plate is disposed at the terminal surface of the stacked battery cells and includes an electrode hole through which the electrode is exposed. a first coupling unit including an alignment protrusion is disposed on one side of the end plate, and a second coupling unit including an accommodation unit is disposed on an opposite side of the end plate. The accommodation unit of the second coupling unit is configured to be coupled with an alignment protrusion of a first coupling unit of an end plate of an adjacent battery module.

13 Claims, 7 Drawing Sheets

BATTERY MODULE

BACKGROUND

1. Field

The embodiment relates to a battery module, and more particularly, to a battery module including an end plate to facilitate coupling battery modules.

2. Description of the Related Art

Unlike a primary battery which is not chargeable, a secondary battery is reusable through charging and discharging. The secondary battery may be used as an energy source for mobile devices, electric cars, hybrid vehicles, electric bicycles, uninterruptible power suppliers, and the like. The secondary battery may be used in a single battery form or in a battery module of a plurality of batteries connected in a unit depending on types of external devices using the battery.

Small mobile devices such as mobile phones may operate for a predetermined period of time using output and capacity of a single battery, while electric cars, hybrid vehicles, and the like, which operate for a long time with high power prefer a battery module in view of output and capacity. The battery module may be used with a plurality of batteries connected in series or in parallel depending on needed output and capacity.

SUMMARY

Exemplary embodiments are to provide an end plate to facilitate coupling battery modules.

Further, exemplary embodiments are to provide an end plate having a structure to prevent a short circuit between an electrode and an adjacent wire.

According to an aspect of the present invention, there is provided a battery module that is adaptable for coupling with an adjacent battery module, the battery module including a battery array including at least two battery cells that are stacked, the battery cells each including a terminal surface, where an electrode and a vent are exposed, and an opposite bottom side, and an end plate disposed at the terminal surface of the stacked battery cells and including an electrode hole, through which the electrode is outwardly exposed, a first coupling unit on one side of the end plate, and a second coupling unit on another side of the end plate, wherein the second coupling unit is configured to be coupled with another first coupling unit of an end plate of the adjacent battery module.

The first coupling unit may include an alignment protrusion, and the second coupling unit may include an accommodation unit that accommodates the alignment protrusion of the first coupling unit of the end plate of the adjacent battery module.

The first coupling unit may include at least two alignment protrusions, and the second coupling unit may include a number of the accommodation units corresponding to a number of the alignment protrusions.

The battery array may have a plurality of layers, each layer including a pair of battery cells disposed such that respective bottom sides of the pair of battery cells face each other, the end plate may be provided at the terminal surface of the battery cells of the battery array, and the battery module further may further include a fixing member connected to the end plate to fix the battery array.

The first coupling unit and the second coupling unit may include a first through hole extending in a lateral direction such that the second coupling member and the first coupling member of the adjacent battery module may be configured to be connected through a bolt and a nut.

The first coupling unit may include a second through hole to accommodate a bolt, the second coupling unit may include a nut that is configured to be coupled with the bolt of the first coupling unit of the adjacent battery module, and the second coupling unit and the nut may be coupleable with each other in a stud bolt configuration.

The bolt and the nut may be formed as an integrated body.

The first coupling unit and the second coupling unit may protrude from the end plate.

The battery module may further include an insulating wall extending from the first coupling unit and the second coupling unit, and being formed around the electrode hole.

The first coupling unit and the second coupling unit may respectively include a wire accommodation unit that accommodates a wire.

The end plate may include a wire fixing unit formed between the wire accommodation units to fix the wire.

The wire fixing unit includes a third through hole extending in a vertical direction.

The end plate may include an upper extending unit extending outwardly from an upper end of the end plate, and a lower extending unit extending outwardly from a lower end of the end plate, the lower extending unit including a fourth through hole to accommodate a fixing bolt, and the upper extending unit including a cut part in a position corresponding to the fourth through hole.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1A:
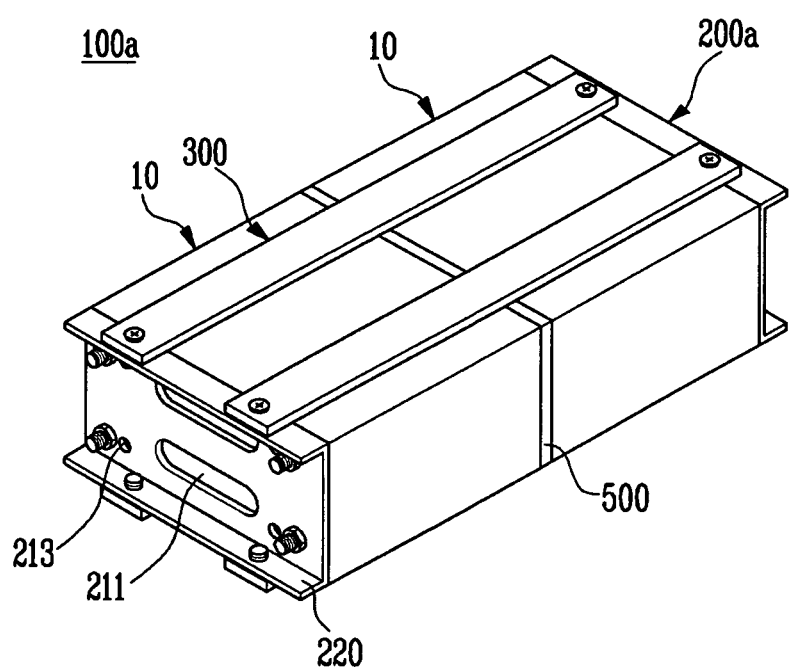
FIG. 1A illustrates a perspective view of an example of a horizontally arranged battery module.

Korean Patent Application No. 10-2010-0109182, filed on Nov. 4, 2010, in the Korean Intellectual Property Office, and entitled: "Battery Module," is incorporated by reference herein in its entirety.

In the following detailed description, only certain exemplary embodiments have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the other element or be indirectly on the other element with one or more intervening elements interposed therebetween. Also, when an element is referred to as being "connected to" another element, it can be directly connected to the other element or be indirectly connected to the other element with one or more intervening elements interposed therebetween. Hereinafter, like reference numerals refer to like elements.

Hereinafter, exemplary embodiments of the present invention will be described in detail with reference to the accompanying drawings. In the specification, terms to indicate directions, such as "up," "down," "right," and "left," are based on directions in the drawings unless the context clearly indicates otherwise.

In the following description, the term "battery array" may refer to a plurality of battery cells stacked or arranged, and the term "battery module array" may refer to a plurality of battery modules, as further described herein, that are electrically connected or arranged to be electrically connected. The term "horizontally arranged" may refer to an orientation wherein battery cells are arranged such that each battery cell is supported on a greater side of the battery cell. Terms such as "upper," "lower," "lateral," etc. may be understood with respect to such an orientation. It is to be understood that such terms are used for convenience of description and that a battery module according to the present claims is not limited to the described orientation.

Figure 1B:
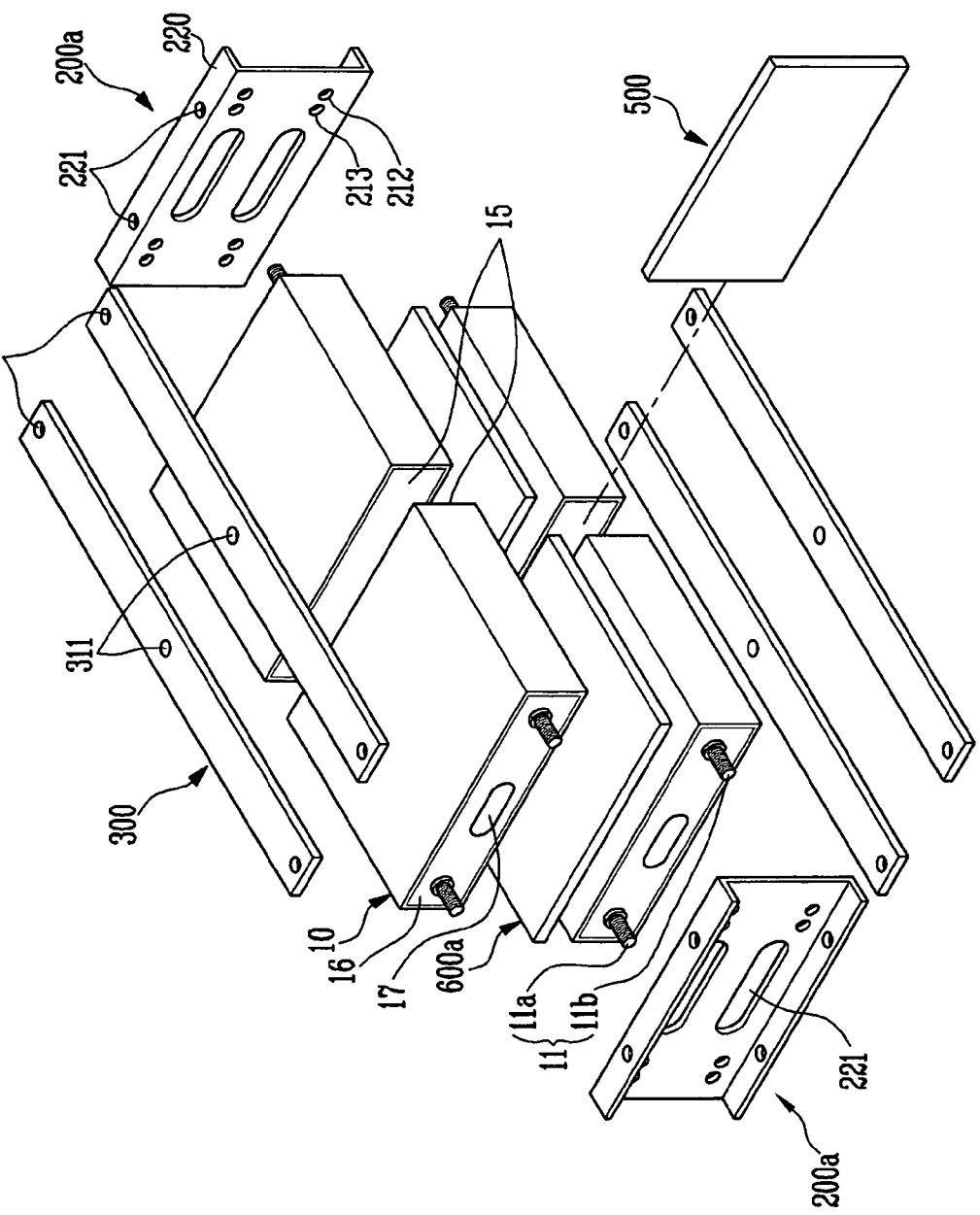
FIG. 1B illustrates an exploded perspective view of the battery module of FIG. 1A.

Referring to FIGS. 1A and 1B, a type and a configuration of a battery module 100$a$ according to an embodiment are described. FIG. 1A illustrates a perspective view of an example of the horizontally arranged battery module, and FIG. 1B illustrates an exploded perspective view of the battery module of FIG. 1A.

The horizontally arranged battery module 100$a$ shown in FIGS. 1A and 1B includes a plurality of battery cells 10, an insulation component, and a fixing component, which constitute a battery array.

The battery cells 10 of the present embodiment may have a hexahedral shape. A terminal surface 11 of a battery cell 10 includes an electrode 11, which includes a negative electrode 11$a$ and a positive electrode 11$b$, and a vent 17. The vent 17 is formed in a middle portion of the terminal surface 11. The vent 17 is formed to discharge gas generated in a battery cell 10. The electrodes 11$a$ and 11$b$ are disposed near opposite ends of the vent 17. The electrode 11 functions as a path through which an electric current generated in a battery cell 10 communicates with an outside. Hereinafter, a side of the battery cell 10 opposite from the terminal surface 11 may be referred to as a bottom side 15, even though such a bottom side 15 may not be oriented at a bottom with respect to a direction of gravity.

Figure 7:
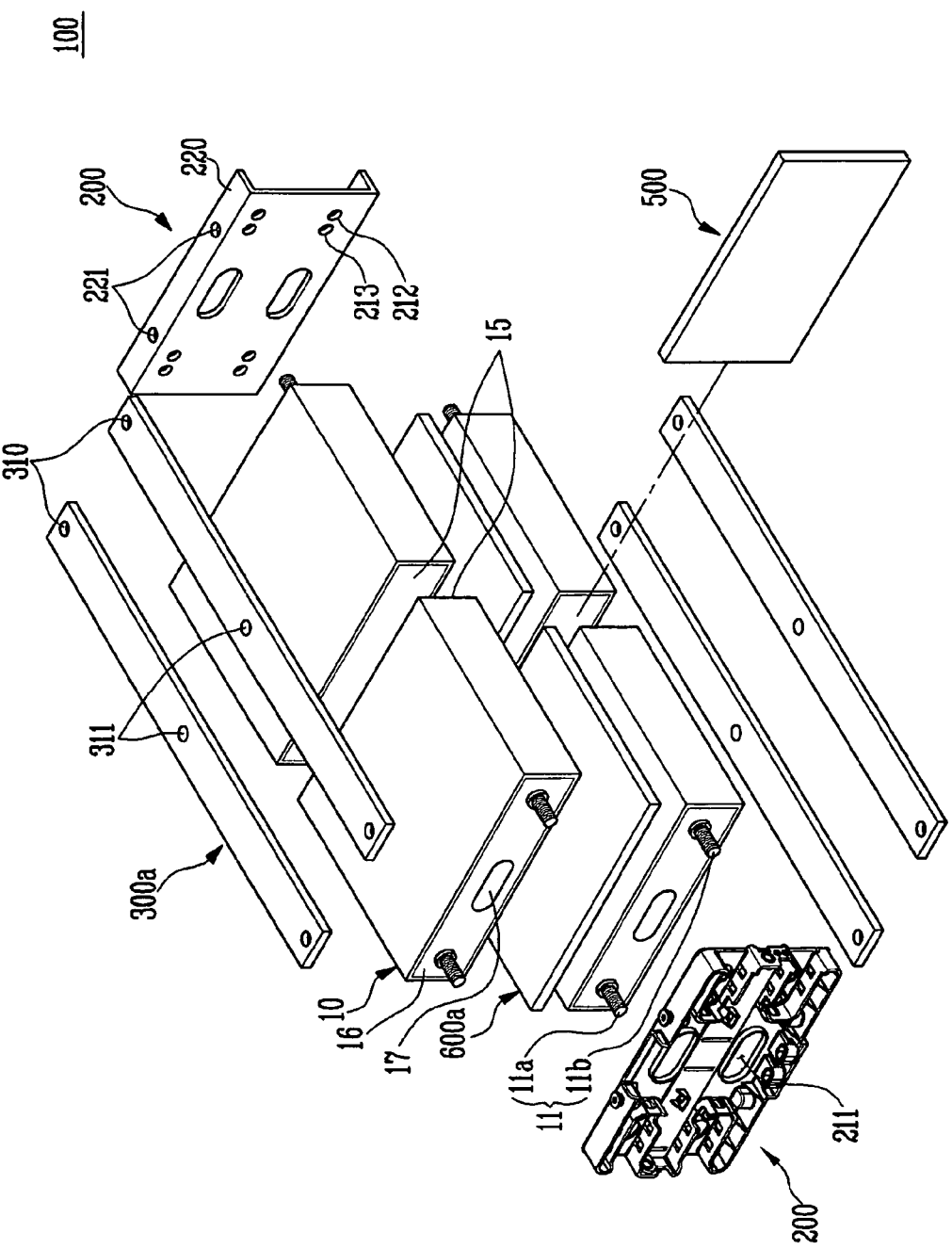
FIG. 7 illustrates an exploded perspective view of a battery module including the end plate of FIG. 5.

One battery cell 10 may be stacked on another to form a battery array. For spatial efficiency, one layer formed of two battery cells 10 may be stacked on another layer of two battery cells 10. As shown in FIG. 1B, two battery cells 10 may be disposed horizontally with bottom sides 15 facing each other. Each electrode 11 may be disposed to face an outside. The pair of battery cells 10 thus disposed may be stacked on another pair of battery cells 10 to form two or more layers, as shown in FIGS. 1B and 7. The present embodiment may be applied to a case where battery cells 10 are stacked into two or more layers, but is not limited thereto.

The fixing component of the battery module 100$a$ may include upper and lower fixing members 300, an end plate 200$a$, and the like. Herein, the terms "fix" and "fixing" may refer to a restriction of movement, such as, for example, bracing or immobilizing. The upper and lower fixing members 300 may be fixed with or attached to upper and lower end portions of the end plate 200$a$ to restrict up and down movement of the battery arrays 10. The insulation component may include a vertical insulating member 500 and a horizontal insulating member 600$a$. The vertical insulating member 500 may be disposed between the bottom sides 15 of the two battery cells 10 for insulation, and the horizontal insulating member 600$a$ may be disposed between two stacked battery cells 10 for insulation.

The present embodiment relates to the end plate 200$a$, which will be further described below.

Figure 2:
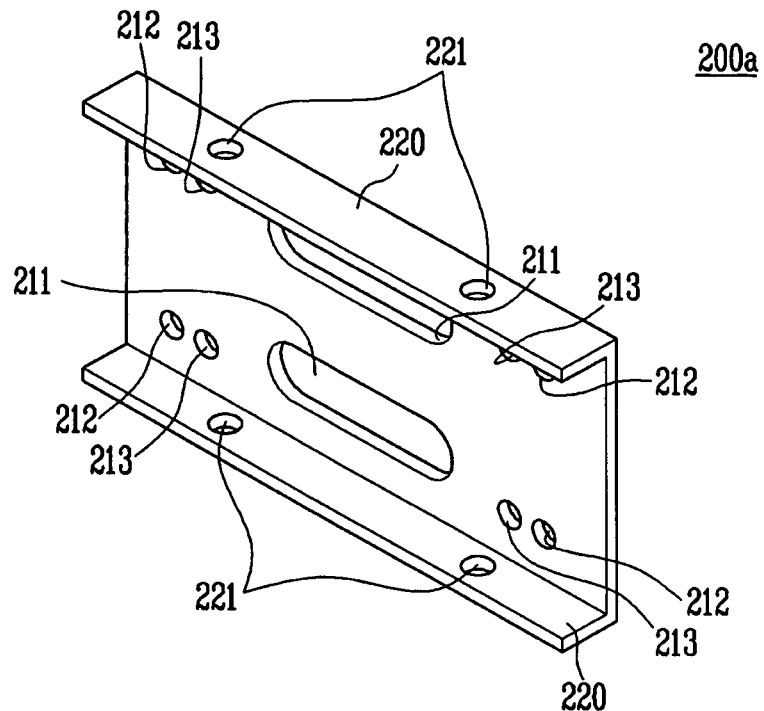
FIG. 2 illustrates a perspective view of an end plate according to a comparative embodiment.
Figure 3:
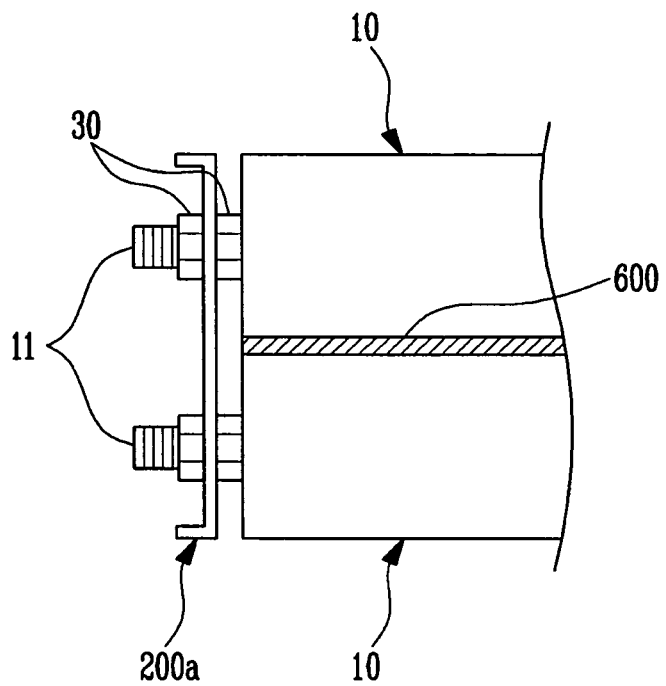
FIG. 3 illustrates a lateral view of the end plate of FIG. 2 connected to a battery cell.

Referring to FIGS. 2 and 3, a configuration of the end plate 200$a$ is described. FIG. 2 is a perspective view of an example of the end plate according to a comparative embodiment, and FIG. 3 is a lateral view illustrating an example of a structure of connecting the end plate to a battery cell.

The end plate 200$a$ is a type of a fixing member to fix the above stacked battery cells 10. In the present embodiment, the end plate 200$a$ used for a horizontally arranged two-layer battery module is described as an illustrative example.

The end plate 200$a$ includes a pair of first coupling holes 221 in lower and upper sides for coupling using a screw or the like. A first extending unit 220 may extend perpendicularly from upper and lower ends of the end plate 200$a$, and the first coupling holes 221 may extend through the first extending unit. For example, the first coupling holes 221 may extend through the first extending part 220 in a vertical direction.

The end plate 200$a$ may include a vent hole 211 formed in an upper middle portion and a vent hole 211 formed in a lower middle portion. The vent hole 211 may have a shape and may be disposed in a position corresponding to the vent 17 of a battery cell 10 (see FIG. 1B).

Electrode holes 212 may be formed near opposite ends of the vent hole 211. In the battery module stacked in two layers according to the present embodiment, four electrode holes 212 are formed. As shown in FIG. 7, the electrode 11 of the battery cells 10 is exposed through the respective electrode holes 212. Nuts 30 may be tightened on a bolt placed on the electrode 11 at opposite ends of the end plate 200$a$, so that the respective battery cells 10 may be fastened with the end plate 200$a$ (see FIG. 3).

A detection hole 213 may be formed between each electrode hole 212 and each vent hole 211. The detection hole 213 allows a detection unit (not shown) of various devices to access in order to test voltage of each battery cell 10 constituting the battery module.

Figure 4:
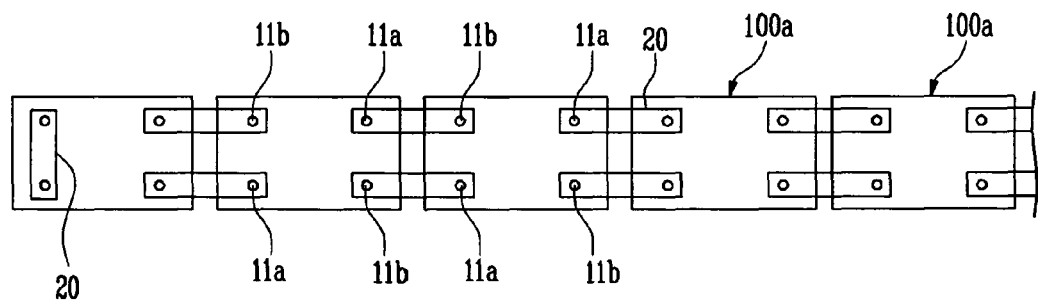
FIG. 4 illustrates a schematic view of a method of connecting battery modules.

An example of connecting battery modules is described with reference to FIG. 4. FIG. 4 illustrates a schematic view illustrating the example of connecting a plurality of battery modules in series.

Electrodes of the respective battery modules 100$a$ are connected using a conductive connection member 20. Connection of the battery modules shown in FIG. 4 is an example of series connection. The battery modules 100$a$ shown schematically in FIG. 4 include upper battery cells in an upper part and lower battery cells in a lower part of the battery modules 100$a$. In the upper part of the battery modules 100$a$, positive electrodes 11$b$ of the upper battery cells are positioned on a left side, and negative electrodes 11$a$ of the upper battery cells are positioned on a right side. In the lower part of the battery modules 100$a$, negative electrodes 11$a$ of the lower battery cells are positioned on the left side, and positive electrodes 11$b$ of the lower battery cells positioned on the right side. The electrodes 11 of the respective battery modules 100$a$ may be disposed so that electrodes in the upper part have an opposite polarity to electrodes in the lower part.

Electrodes 11 of neighboring battery modules 100a may be connected with each other using the conductive connection member 20. When there is no neighboring electrode 11, the remaining electrode 11 positioned in the upper part and the remaining electrode 11 positioned in the lower part are connected with each other to form a single electric path.

When the battery modules 100a are electrically connected in the above manner, a member to fix the respective battery modules 100a may be used.

Figure 5:
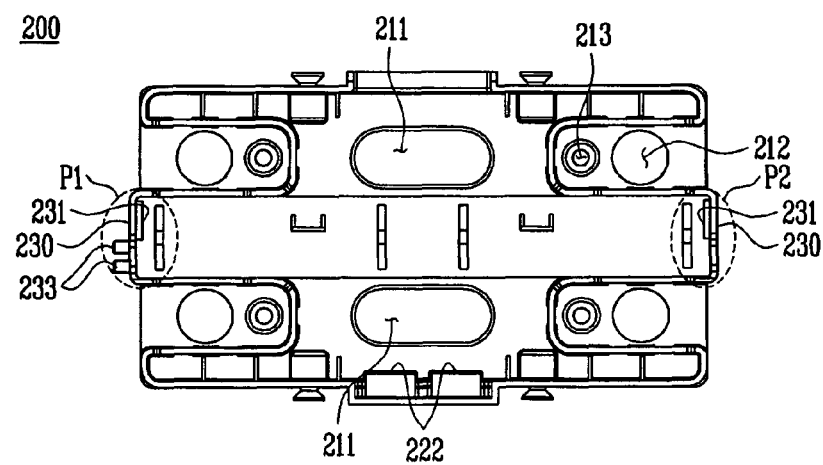
FIG. 5 illustrates a front view of an end plate according to an embodiment.
Figure 6A:
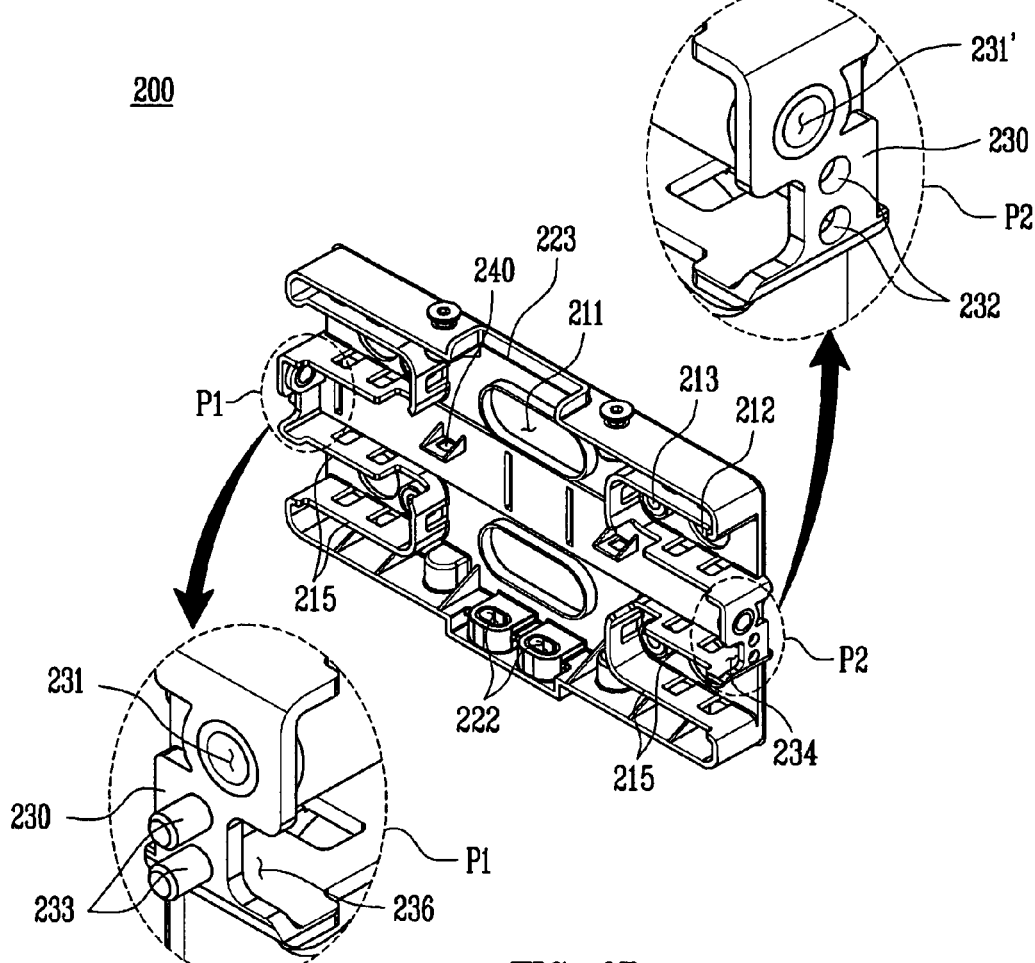
FIG. 6A illustrates a perspective view of the end plate of FIG. 5.
Figure 6B:
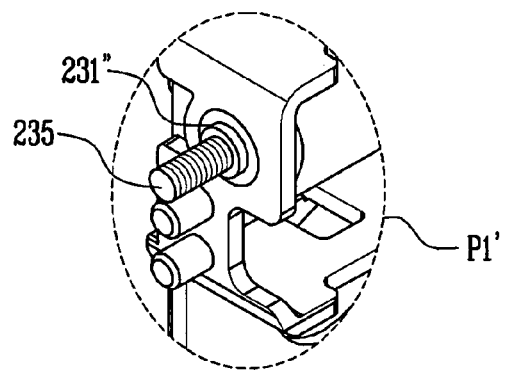
FIG. 6B illustrates an enlarged view of a connected structure including an integrated stud bolt.

Referring to FIGS. 5 to 6B, an end plate formed in view of coupling and insulating battery modules with and from each other is described. FIG. 5 illustrates a front view os the end plate according to an embodiment, FIG. 6A illustrates a perspective view of the end plate of FIG. 5, and FIG. 6B illustrates an enlarged view illustrating a connected structure including an integrated stud bolt.

In addition to the components of the end plate described above, the end plate 200 further includes a coupling unit 230 to connect a plurality of battery modules to each other. The coupling unit 230 extends from opposite lateral sides of the end plate 200 in a direction that is perpendicular to the opposite lateral sides. The coupling unit 230 includes a first coupling part P1 on one side of the end plate and a second coupling part P2 on an opposite side of the end plate. The coupling part P1 and the coupling part P2 correspond in structure to each other such that the first coupling part P1 may be coupled to a second coupling part of one adjacent battery module and the second coupling part P2 may be coupled to a first coupling part of another adjacent battery module. As shown in an enlarged view of FIG. 6A, the coupling part P1 is formed with a first through hole 231 and an alignment protrusion 233. The coupling part P2 is formed with a corresponding first through hole 231' corresponding to the first through hole 231 and an accommodation part 232 to accommodate the alignment protrusion 233. Here, two or more pairs of alignment protrusions 233 and corresponding accommodation parts 232 may be formed.

The first through hole 231 and the corresponding first through hole 231' may be formed in corresponding positions to be connected through a bolt and a nut.

The first through hole 231 and the corresponding first through hole 231' may be formed in a stud bolt configuration. The term "stud bolt" may refer to a type of a bolt that has bolt-style threaded opposite end portions, a nut being formed on one end portion to be fastened semi-permanently in advance and a nut being threaded at the other end portion. As shown in FIG. 6B, a screw 231" may be formed on one lateral side to accommodate one opposite end of a bolt 235. The screw 231" may not be formed separately but may include the bolt 235 on one lateral side to form an integrated stud bolt.

An insulating wall 215 may extend from the coupling unit 230 between the electrode holes 212 in the upper part of the end plate 200 and the electrode holes 212 in the lower part of the end plate 200 to enclose or electrically isolate the electrode holes 212 and the detection holes 213 from other portions of the end plate 200. The coupling unit 230 and the insulating wall 215 may be formed in an integrated shape to increase strength of the end plate 200 and to provide structural stability.

Further, a wire accommodation unit 236 may be formed in the coupling unit 230 to accommodate a wire (not shown) passing through the end plate 200. A part of the wire accommodation unit 236 may be cut to provide a space through which the wire passes. Further, a wire fixing unit 240 may be formed between the wire accommodation units 236 that are located in the coupling units 230 at opposite lateral sides of the end plate 200 to fix the wire. The wire fixing unit 240 may include a through hole, which may be oriented in a vertical direction, such that the wire may be bound using a string-type member.

Figure 8:
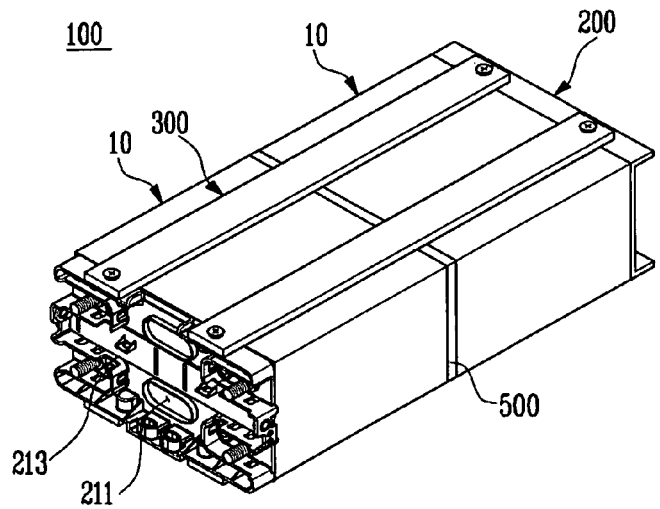
FIG. 8 illustrates a perspective view of the battery modules of FIG. 7 connected.
Figure 9:
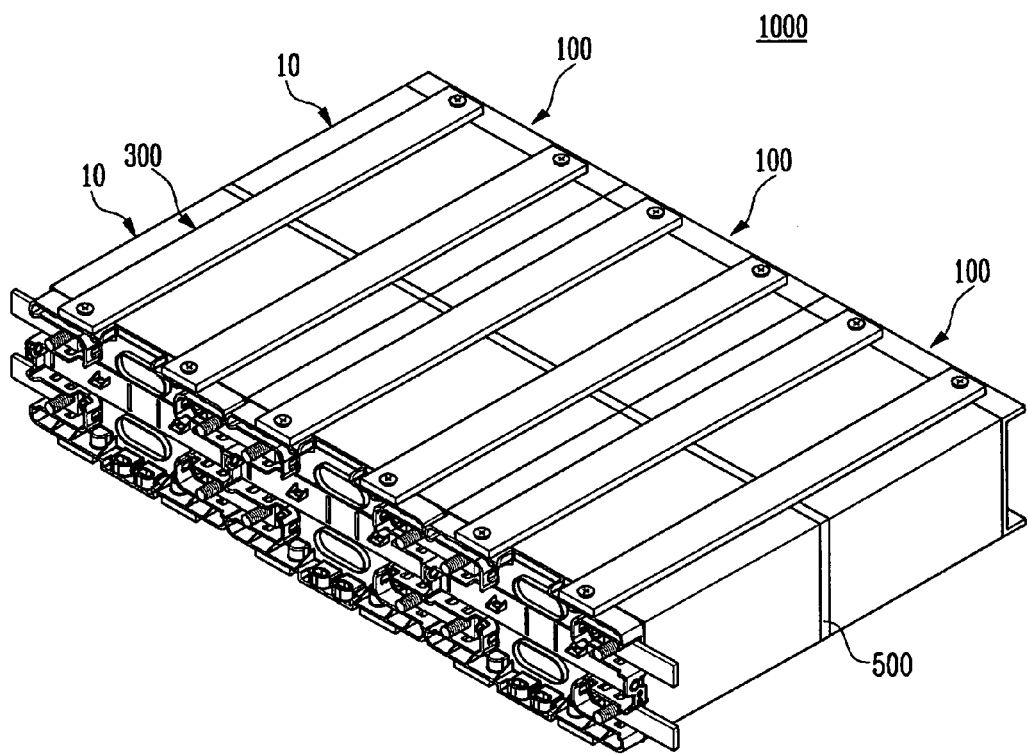
FIG. 9 illustrates a perspective view of connected battery modules according to an embodiment.

Referring to FIGS. 7 to 9, an assembled structure of a battery module including an end plate and a battery module array according to an embodiment are described. FIG. 7 illustrates an exploded perspective view of the battery module including the end plate of FIG. 5, FIG. 8 illustrates a perspective view the battery module of FIG. 7, and FIG. 9 is a perspective view illustrating connected battery modules according to an embodiment.

As shown in FIG. 7, the end plate 200 according to the embodiment described above is fixed to each terminal surface of the battery array 10 to form the battery module 100 of FIG. 8.

As described above, a plurality of battery modules 100 are connected to each other using a coupling component to form a large battery module array 1000 having a uniform height as shown in FIG. 9. The battery module array 1000 may be formed with high output and/or high capacity in a space having a limited height.

As described above, according to an aspect of exemplary embodiments, an end plate facilitates coupling battery modules with each other and securely maintains the coupling through an alignment member and a coupling member which are formed on a lateral side.

According to an aspect of exemplary embodiments, an end plate prevents a short circuit between an electrode and an adjacent wire, so that a risk of a short circuit which may occur during operation of a battery module is prevented in advance.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope as set forth in the following claims.

What is claimed is:

1. A battery module for coupling with an adjacent battery module, the battery module comprising:
   a battery array including at least two battery cells that are stacked, the battery cells each including a terminal surface, where an electrode and a vent are exposed, and an opposite bottom side; and
   an end plate disposed at the terminal surface of the stacked battery cells and including an electrode hole, through which the electrode is outwardly exposed, a first coupling unit on one side of the end plate, and a second coupling unit on another side of the end plate, wherein the second coupling unit is configured to be coupled with another first coupling unit of an end plate of the adjacent battery module.

2. The battery module as claimed in claim 1, wherein the first coupling unit includes an alignment protrusion, and the second coupling unit includes an accommodation unit that accommodates the alignment protrusion of the first coupling unit of the end plate of the adjacent battery module.

3. The battery module as claimed in claim 2, wherein the first coupling unit includes at least two alignment protrusions, and the second coupling unit includes a number of the accommodation units corresponding to a number of the alignment protrusions.

4. The battery module as claimed in claim 1, wherein:
- the battery array has a plurality of layers, each layer including a pair of the battery cells disposed such that respective bottom sides of the pair of battery cells face each other;
- the end plate is provided at the terminal surface of the cells in the battery array; and
- the battery module further includes a fixing member connected to the end plate to fix the battery array.

5. The battery module as claimed in claim 1, wherein the first coupling unit and the second coupling unit include a first through hole extending in a lateral direction such that the second coupling member and the first coupling member of the adjacent battery module are configured to be connected through a bolt and a nut.

6. The battery module as claimed in claim 1, wherein the first coupling unit includes a second through hole to accommodate a bolt, the second coupling unit includes a nut that is configured to be coupled with the bolt of the first coupling unit of the adjacent battery module, and the second coupling unit and the nut are coupleable with each other in a stud bolt configuration.

7. The battery module as claimed in claim 6, wherein the bolt and the nut are formed as an integrated body.

8. The battery module as claimed in claim 7, further comprising an insulating wall extending from the first coupling unit and the second coupling unit, and being formed around the electrode hole.

9. The battery module as claimed in claim 7, wherein the first coupling unit and the second coupling unit respectively include a wire accommodation unit that accommodates a wire.

10. The battery module as claimed in claim 9, wherein the end plate includes a wire fixing unit formed between the wire accommodation units to fix the wire.

11. The battery module as claimed in claim 9, wherein the wire fixing unit includes a third through hole extending in a vertical direction.

12. The battery module as claimed in claim 1, wherein the first coupling unit and the second coupling unit protrude from the end plate.

13. The battery module as claimed in claim 1, wherein the end plate includes an upper extending unit extending outwardly from an upper end of the end plate and a lower extending unit extending outwardly from a lower end of the end plate, the lower extending unit including a fourth through hole to accommodate a fixing bolt, and the upper extending unit including a cut part in a position corresponding to the fourth through hole.

\* \* \* \* \*